United States Patent
Li

(10) Patent No.: US 12,169,620 B2
(45) Date of Patent: Dec. 17, 2024

(54) VIDEO DISPLAY METHOD, DEVICE AND SYSTEM, AND VIDEO CAMERA

(71) Applicant: Hangzhou Hikvision Digital Technology Co., Ltd., Hangzhou (CN)

(72) Inventor: Wenwei Li, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 680 days.

(21) Appl. No.: 17/285,727

(22) PCT Filed: Jan. 16, 2020

(86) PCT No.: PCT/CN2020/072521
§ 371 (c)(1),
(2) Date: Apr. 15, 2021

(87) PCT Pub. No.: WO2020/147792
PCT Pub. Date: Jul. 23, 2020

(65) Prior Publication Data
US 2022/0004748 A1    Jan. 6, 2022

(30) Foreign Application Priority Data

Jan. 16, 2019 (CN) .................. 201910040917.7
Jan. 16, 2019 (CN) .................. 201910040919.6

(51) Int. Cl.
*G06F 3/0482* (2013.01)
*G06F 3/0481* (2022.01)
(Continued)

(52) U.S. Cl.
CPC .......... *G06F 3/0482* (2013.01); *G06F 3/0481* (2013.01); *G06F 3/04842* (2013.01);
(Continued)

(58) Field of Classification Search
CPC .. G06F 3/0482; G06F 3/0481; G06F 3/04842; G06F 2203/04803; G06F 3/0484;
(Continued)

(56) References Cited

U.S. PATENT DOCUMENTS 9,544,563 B1 * 1/2017 Chin .................... H04N 23/632
2010/0141767 A1 6/2010 Mohanty et al.
(Continued)

FOREIGN PATENT DOCUMENTS

CN     101094395     12/2007
CN     202583667     12/2012
(Continued)

OTHER PUBLICATIONS

International Search Report and Written Opinion issued in Corresponding PCT Application No. PCT/CN2020/072521, dated Mar. 30, 2020 (English Translation provided).
(Continued)

*Primary Examiner* — Andrae S Allison
*Assistant Examiner* — Emmanuel Silva-Avina
(74) *Attorney, Agent, or Firm* — NORTON ROSE FULBRIGHT US LLP

(57) ABSTRACT

A method, apparatus and system for video display and a camera are disclosed. The camera includes one wide-field lens assembly and a wide-field sensor corresponding to the wide-field lens assembly; at least one narrow-field lens assembly and narrow-field sensor corresponding to the narrow-field lens assembly, wherein an angle of view of the wide-field lens assembly is greater than an angle of view of the narrow-field lens assembly, and for a same target, a definition of the wide-field sensor is smaller than that of the narrow-field sensor; and a processor configured for performing human body analysis on the wide-field image and performing face analysis, head and shoulder analysis or
(Continued)

human body analysis on at least one frame of narrow-field image. The methods, apparatuses and systems can reduce the workload of installing and adjusting the cameras during monitoring, the performance requirements for the server, and monitoring costs.

4 Claims, 7 Drawing Sheets

(51) Int. Cl.
*G06F 3/04842* (2022.01)
*G06F 18/22* (2023.01)
*G06T 7/292* (2017.01)
*G06T 11/00* (2006.01)
*G06V 20/52* (2022.01)
*G06V 40/10* (2022.01)
*G06V 40/16* (2022.01)
*H04N 7/18* (2006.01)
*H04N 23/698* (2023.01)
*H04N 23/90* (2023.01)

(52) U.S. Cl.
CPC .............. *G06F 18/22* (2023.01); *G06T 7/292* (2017.01); *G06T 11/00* (2013.01); *G06V 20/52* (2022.01); *G06V 40/103* (2022.01); *G06V 40/16* (2022.01); *H04N 7/181* (2013.01); *H04N 23/698* (2023.01); *H04N 23/90* (2023.01); *G06T 2207/30196* (2013.01); *G06V 40/173* (2022.01)

(58) Field of Classification Search
CPC ....... G06T 2200/24; G06T 2207/30232; G06T 2207/30196; G06V 20/52; G06V 40/103; G06V 40/16; G06V 40/173

USPC ......................................................... 382/103
See application file for complete search history.

(56) References Cited

U.S. PATENT DOCUMENTS

| | | | |
|---|---|---|---|
| 2013/0170696 A1* | 7/2013 | Zhu | G06V 10/75 |
| | | | 382/103 |
| 2015/0215516 A1 | 7/2015 | Dolgin | |
| 2016/0277673 A1 | 9/2016 | Carr et al. | |
| 2016/0341938 A1 | 11/2016 | Sun | |
| 2018/0007264 A1* | 1/2018 | Chuang | H04N 23/62 |
| 2018/0253603 A1* | 9/2018 | Yamamoto | G06V 20/52 |
| 2021/0183041 A1* | 6/2021 | Li | G06V 20/52 |
| 2021/0233254 A1* | 7/2021 | Hirakawa | G08B 13/19682 |

FOREIGN PATENT DOCUMENTS

| | | |
|---|---|---|
| CN | 102932605 | 2/2013 |
| CN | 103581627 | 2/2014 |
| CN | 103780873 | 5/2014 |
| CN | 104427337 | 3/2015 |
| CN | 105872475 | 8/2016 |
| CN | 106503622 | 3/2017 |
| CN | 107978051 | 5/2018 |
| CN | 108076297 | 5/2018 |
| CN | 108881713 | 11/2018 |
| JP | WO 2018180039 | 10/2018 |

OTHER PUBLICATIONS

Office Action issued in Corresponding China Application No. 201910040919.6, dated Aug. 4, 2021 (English Abstract provided).

* cited by examiner

VIDEO DISPLAY METHOD, DEVICE AND SYSTEM, AND VIDEO CAMERA

CROSS REFERENCE TO RELATED APPLICATIONS

The present application is a national phase application under 35 U.S.C. § 371 of International Application No. PCT/CN2020/072521, filed Jan. 16, 2020, which claims the benefit of priority to Chinese patent application No. 201910040919.6 filed with China National Intellectual Property Administration on Jan. 16, 2019 and entitled "Camera", and the priority to Chinese patent application No. 201910040917.7 filed with China National Intellectual Property Administration on Jan. 16, 2019 and entitled "Video display method, device and system", each of which are incorporated herein by reference in their entireties.

TECHNICAL FIELD

The present application relates to the technical field of video surveillance, and in particular to a method, apparatus and system for video display and a camera.

BACKGROUND

Currently, a scene is monitored by a plurality of cameras. Specifically, a plurality of cameras are deployed in the scene, a monitoring area of each camera is a partial area of the scene, and the monitoring areas of the plurality of cameras constitute the entire scene. Each camera captures a video frame, performs face recognition on the video frame, and sends the recognized face, track information of a person corresponding to the face and the video frame to a server. The server stitches the video frames captured by the cameras at a certain moment to obtain a monitoring video frame of the entire scene at the moment. In addition, the server needs to compare the faces recognized by the cameras to find a plurality of pieces of track information of the same person from the track information sent by the cameras, combines the plurality of pieces of track information and then displays the combined information on the monitoring video frame.

Therefore, in order to monitor a scene and obtain high-definition video frames, it is necessary to install a plurality of cameras and adjust these cameras to ensure that the monitoring areas of the plurality of cameras overlap and form the entire scene. However, in the installing and adjusting of the cameras, a worker will cope with a heavy workload. In addition, in monitoring a scene, the server needs to perform processing operations such as video frame stitching and the combination of track information, which requires higher performance of the server. However, the use of a higher-performance server will result in higher monitoring cost.

SUMMARY

The present application provides a method, apparatus and system for video display and a camera, which are capable of reducing the workload on the installing and adjusting of the cameras, the performance requirement on a server, and the monitoring cost in monitoring a scene. The specific technical solutions are as follows.

An embodiment of the present application provides a camera, which includes:

a wide-field lens assembly and a wide-field sensor corresponding to the wide-field lens assembly, the wide-field sensor being configured for generating a wide-field video frame based on light entered from the wide-field lens assembly;

a narrow-field lens assembly and a narrow-field sensor corresponding to the narrow-field lens assembly, the narrow-field sensor being configured for generating a narrow-field video frame based on light entered from the narrow-field lens assembly; wherein an angle of view of the wide-field lens assembly is greater than an angle of view of the narrow-field lens assembly, and for a same target, a definition of the wide-field sensor is smaller than a definition of the narrow-field sensor; and a processor, configured for performing human body analysis on the wide-field video frame and performing face analysis, head and shoulder analysis or the human body analysis on the narrow-field video frame.

An embodiment of the present application further provides a method for video display, which is applied to a server having a graphical user interface. The graphical user interface includes:

one video display window, located on a left side of the graphical user interface and configured for displaying a video frame sent by a camera in real time; wherein the video frame comprises N targets, wherein N is a positive integer, and N≥1;

one window list, located on a right side of the graphical user interface and configured for displaying alarm information associated with each of the targets sent by the camera; wherein the alarm information associated with each of the targets comprises track information of the target and an image containing the target, wherein the track information of the target comprises at least one image coordinate of the target, and the image containing the target comprises a face image and/or a human body image of the target; and one play control, located on an upper right side of the video display window, and configured for displaying the face image or the human body image comprised in the alarm information.

The method includes:

receiving a selection instruction, input from the outside, for alarm information $M_1$ displayed in the window list;

acquiring the track information $M_2$ comprised in the alarm information $M_1$, wherein the track information $M_2$ comprises at least one image coordinate of a target D; and superimposing the at least one image coordinate on the video frame for display.

In an embodiment, after receiving the selection instruction, input from the outside, for the alarm information $M_1$ displayed in the window list, the method further includes:

acquiring a face image or a human body image included in the alarm information $M_1$; and controlling the play control to display the acquired face image or human body image.

An embodiment of the present application further provides a system for video display, including a server having a graphical user interface and a multi-sensor camera connected to the server.

The multi-sensor camera includes: one wide-field lens assembly and a wide-field sensor corresponding to the wide-field lens assembly, wherein the wide-field sensor is configured for generating a wide-field video frame based on light entered from the wide-field lens assembly; at least one narrow-field lens assembly and narrow-field sensor corresponding to the narrow-field lens assembly, wherein the narrow-field sensor is configured for generating a narrow-field video frame based on light entered from the corresponding narrow-field lens assembly; wherein an angle of view of the wide-field lens assembly is greater than an angle of view of the narrow-field lens assembly, and for a same target, a definition of the wide-field sensor is smaller than a definition of the narrow-field sensor; and a processor, configured for sending the wide-field video frame to the server in real time, and analyzing the wide-field video frame and the narrow-field video frame to obtain an image containing a target and track information of the target; wherein the wide-field video frame comprises N targets, wherein N is a positive integer, and N≥1.

The graphical user interface includes:

one video display window, located on a left side of the graphical user interface, and configured for displaying a video frame sent by the multi-sensor camera in real time, wherein the video frame is the wide-field video frame or the narrow-field video frame;

one window list, located on a right side of the graphical user interface, and configured for displaying alarm information associated with each target sent by the camera; wherein the alarm information associated with each target comprises track information of the target and an image containing the target, wherein the track information of the target comprises at least one image coordinate of the target, and the image containing the target comprises a face image and/or a human body image of the target; and one play control, located on an upper right side of the video display window, and configured for displaying the face image or the human body image comprised in the alarm information;

the server is configured for receiving a selection instruction, input from the outside, for the alarm information displayed in the window list; acquiring the track information comprised in the alarm information, wherein the track information comprises at least one image coordinate of a target; and superimposing the at least one image coordinate on the video frame for display.

In the technical solution according to the embodiments of present application, the wide-field lens assembly and the wide-field sensor of the camera can monitor the entire scene, and the narrow-field lens assembly and the narrow-field sensor of the camera can capture high-definition images of targets in the scene to realize accurate monitoring of targets. In this case, for a scene, the requirement for monitoring the entire scene and capturing the high-definition images of the targets can be met by installing one camera, without adjusting a plurality of cameras in order to meet the monitoring requirement, which reduces the workload of installing and adjusting the cameras for monitoring while realizing scene monitoring. The server displays a video frame in the video display window, displays alarm information in the window list, and displays a face image or human body image included in the alarm information in the play control. In addition, the server does not need to stitch video frames, combine track information or the like, which reduces the performance requirement for the server. Therefore, it is not necessary to use the server with higher performance during scene monitoring, reducing monitoring costs.

Of course, any product or method of the present application does not necessarily achieve all of the advantages set forth above at the same time.

BRIEF DESCRIPTION OF THE DRAWINGS

In order to illustrate the embodiments of the present application or technical solution in related arts more clearly, the drawings used in the description of the embodiments or related arts will be briefly described below. It is obvious that the drawings in the description below are only some embodiments of the present application, and other drawings can be obtained according to these drawings by those skilled in the art without creative efforts.

DETAILED DESCRIPTION OF THE INVENTION

The technical solution in the embodiments of the present application will be described clearly and completely with reference to the drawings in the embodiments of the present application. Apparently, the described embodiments are only some, but not all, of the embodiments of the present application. All other embodiments obtained by those skilled in the art based on the embodiments in the present application without any inventive effort fall within the protection scope of the present application.

Figure 1:
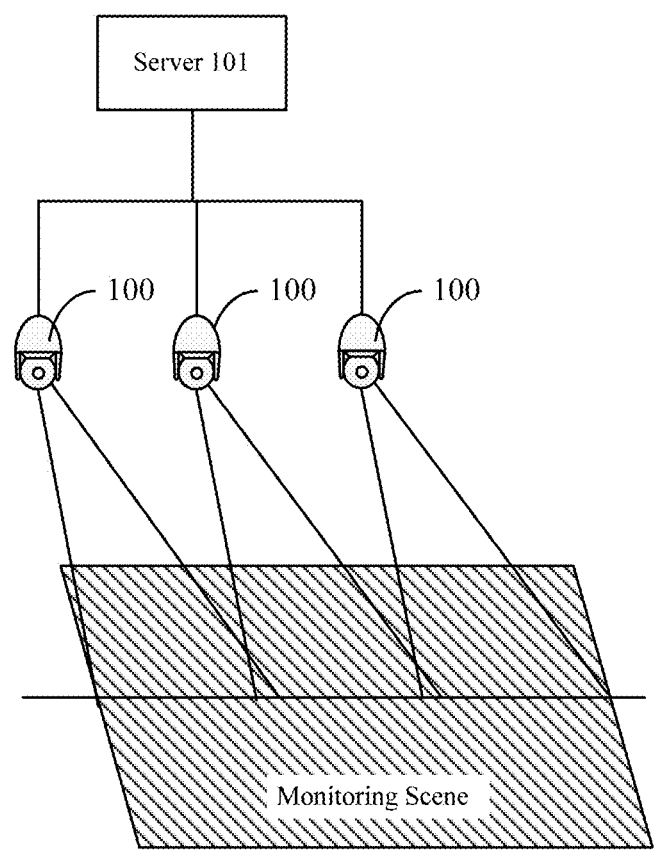
FIG. 1 is a diagram illustrating a deployment of a monitoring scene according to the related art.

Currently, a monitoring scene shown in FIG. 1 includes a plurality of cameras 100 and a server 101. In monitoring a scene, each camera 100 monitors a part of area of the scene and captures video frames. After capturing the video frames, the cameras 100 performs target detection, such as face recognition, on the video frames, and sends the recognized results and the video frames to the server 101. The server 101 stitches the video frames captured by the cameras 100 to obtain monitoring video frames of the entire scene. In addition, the server 101 compares the faces recognized by the cameras 100 to determine the face of the same target, records cameras 100 that have recognized the face and time points at which video frames containing the face are captured, to obtain the track information of the target corresponding to the face. In the embodiments of the present application, the target can be understood as a person having the recognized face.

Therefore, in order to monitor a scene, obtain a high-definition video frame, and facilitate the server 101 to obtain a monitoring video frame of the entire scene, it is necessary to install a plurality of cameras 100 and adjust each camera 100 to ensure that the monitoring areas of the cameras 100 overlap and form the entire scene. However, in the installing and adjusting of the cameras, a worker will cope with a heavy workload. In addition, in monitoring a scene, the server 101 needs to perform processing operations such as video frame stitching and the combination of track information, which requires higher performance of the server. However, the use of a higher performance server will result in higher monitoring costs.

Figure 2:
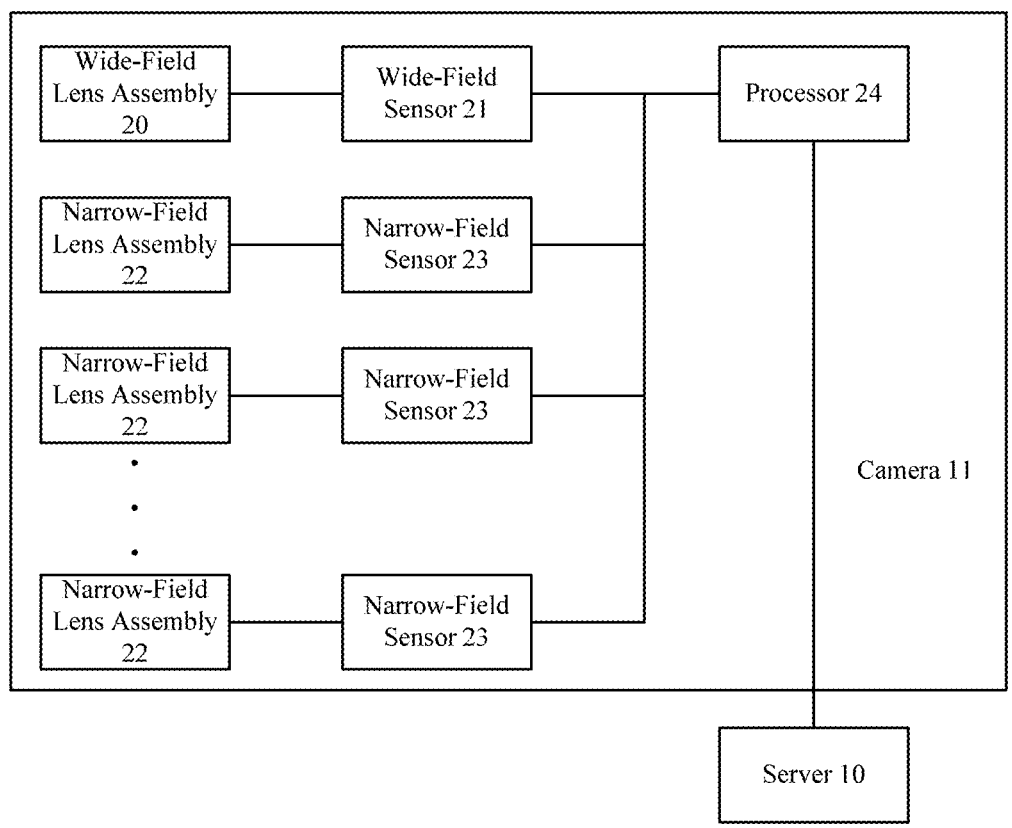
FIG. 2 is a diagram illustrating a first structure of a system for video display according to an embodiment of the present application.

In monitoring a scene, in order to reduce the workload on the installing and adjusting of cameras, reduce the performance requirement on a server and reduce the monitoring costs, an embodiment of the present application provides a system for video display. As shown in FIG. 2, the system for video display includes a server 10 having a graphical user interface, and a multi-sensor camera 11 connected to the server 10.

The multi-sensor camera includes a wide-field lens assembly 20 and a wide-field sensor 21 corresponding to the wide-field lens assembly 20, and a narrow-field lens assembly 22 and a narrow-field sensor 23 corresponding to the narrow-field lens assembly 22.

The wide-field sensor 21 is connected to the wide-field lens assembly 20. Light enters into the camera through the wide-field lens assembly 20, and then the wide-field sensor 21 connected to the wide-field lens assembly 20 generates a wide-field video frame based on the light entered from the wide-field lens assembly 20. There may be one or more narrow-field lens assembly assemblies. One lens corresponds to one sensor. Therefore, there may be one or more narrow-field sensors 23. The narrow-field sensor 23 is connected to the narrow-field lens assembly 22. Light enters into the camera through the narrow-field lens assembly 22, and then the narrow-field sensor 23 connected to the narrow-field lens assembly 22 generates a narrow-filed video frame based on the light entered from the narrow-field lens assembly 22.

An angle of view of the wide-field lens assembly 20 is greater than that of the narrow-field lens assembly 22. For the same target, a definition of the wide-field sensor 21 is smaller than that of the narrow-field sensor 23. It can also be understood that, for the same target, pixels of a wide-field video frame generated by the wide-field sensor 21 are smaller than pixels of a narrow-filed video frame generated by the narrow-field sensor 23.

A processor 24 in the multi-sensor camera 11 sends the wide-field video frame generated by the wide-field sensor 21 to the server 10 in real time, and analyzes the wide-field video frames and the narrow-field video frames to obtain images containing a target and track information of the target. The wide-field video frames include N targets, wherein N is a positive integer, and N≥1.

Figure 3:
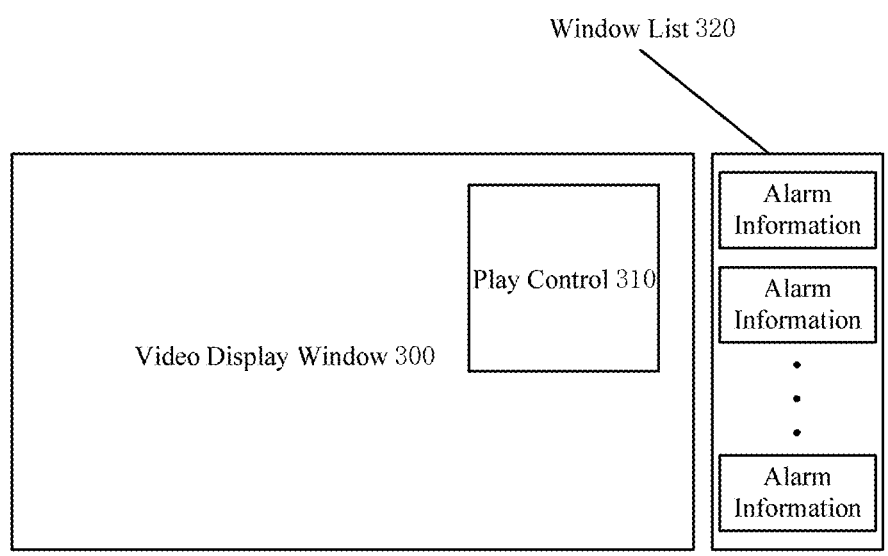
FIG. 3 is a diagram illustrating a structure of a graphical user interface according to an embodiment of the present application.

A graphical user interface of the server 10, as shown in FIG. 3, includes one video display window 300, one window list 320, and one playing control 310.

The video display window 300 is located on the left side of the graphical user interface for displaying the video frame sent by the multi-sensor camera 11 in real time. Here, the video frame may be the above-described wide-field video frame or narrow-field video frame.

The window list 320 is located on the right side of the graphical user interface for displaying alarm information associated with each target sent by the camera. The alarm information associated with each target includes track information of the target and images containing the target. The track information of the target includes at least one image coordinate of the target, and the images containing the target include face images and/or human body images of the target.

The play control 310 is located on the upper right side of the video display window for displaying the face images or the human body images included in the alarm information.

The server 10 is configured for receiving a selection instruction, input from the outside, for alarm information $M_1$ displayed in the window list; acquiring track information $M_2$ included in the alarm information $M_1$, wherein the track information $M_2$ includes at least one image coordinate of a target D; and superimposing the at least one image coordinate to the video frame for display.

In an embodiment of the present application, the target may be understood as a person determined by performing target detection on video frames.

In the technical solution according to the embodiment of present application, the wide-field lens assembly and the wide-field sensor of the camera can be used for monitoring the entire scene, and the narrow-field lens assembly assemblies and the narrow-field sensors of the camera can be used for capturing high-definition images of targets in the scene to realize accurate monitoring of targets. In this case, for one scene, the requirements for monitoring the entire scene and capturing the high-definition images of the targets can be met by installing one camera, without adjusting a plurality of cameras to meet the monitoring requirement, which reduces the workload on the installing and adjusting of the cameras for monitoring while realizing scene monitoring. The server displays a video frame in the video display window, displays the alarm information in the window list, and displays the face image or human body image included in the alarm information in the play control. In addition, the server does not need to stitch video frames and combine track information or the like, which reduces the performance requirement for the server. Therefore, it is not necessary to use the server with higher performance during scene monitoring, reducing monitoring costs.

Based on the above-mentioned video display system, an embodiment of the present application provides a camera, such as a camera 11 shown in FIG. 2. The camera 11 includes:

a wide-field lens assembly 20 and a wide-field sensor 21 corresponding to the wide-field lens assembly 20; and a narrow-field lens assembly 22 and a narrow-field sensor 23 corresponding to the narrow-field lens assembly 22.

In the embodiment of the present application, the lenses in the camera include the wide-field lens assembly 20 and the narrow-field lens assembly 22. There may be one or more narrow-field lens assembly assemblies 22. The wide-field lens assembly 20 may be a short-focus wide-aperture lens and the narrow-field lens assembly 22 may be a long-focus high-definition lens. One lens assembly corresponds to one sensor, that is, one lens assembly is connected to one sensor, which means that a light exit portion of the lens assembly is connected to a light entrance portion of the sensor. If the camera includes M narrow-field lens assembly assemblies 22, the camera includes M narrow-field sensors 23, wherein M is a positive integer, and M≥1.

Light enters into the camera through the wide-field lens assembly 20, and the wide-field sensor 21 generates wide-field video frames based on the light entered from the wide-field lens assembly 20. Light enters into the camera through the narrow-field lens assembly 22, and the narrow-field sensor 23 corresponding to the narrow-field lens assembly 22 generates narrow-field video frames based on the light entered from the narrow-field lens assembly 22.

Figure 4:
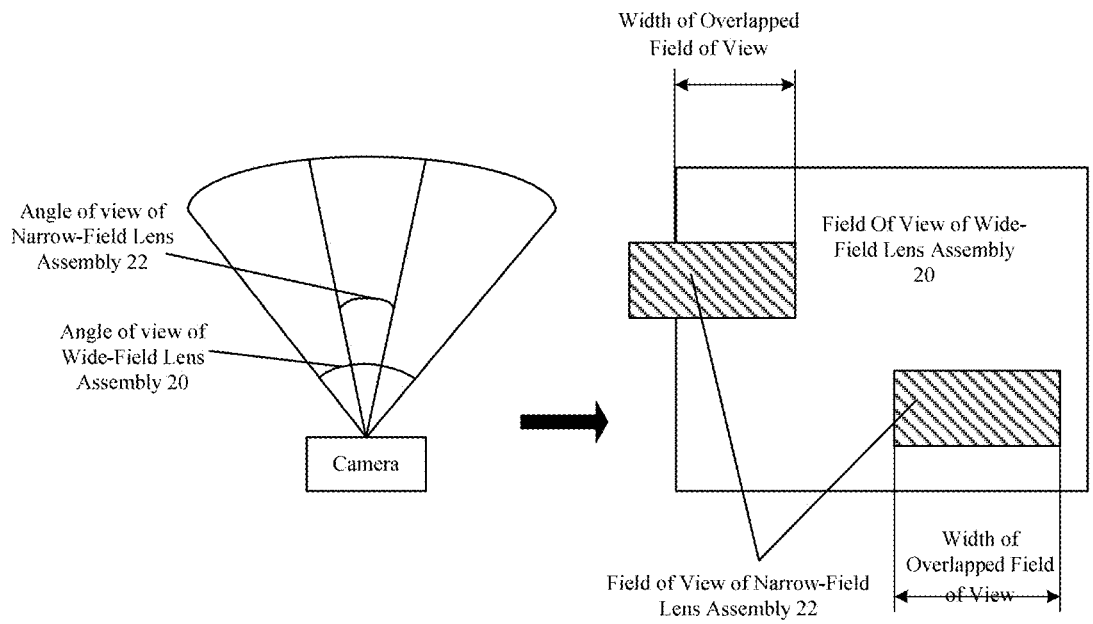
FIG. 4 is a diagram illustrating field of views of a wide-field lens assembly and a narrow-field lens assembly according to an embodiment of the present application.

In the embodiment of the present application, in order to reduce the workload of installing and adjusting the camera for monitoring, the angle of view of the wide-field lens assembly 20 is greater than that of the narrow-field lens assembly 22, as shown in FIG. 4. In addition, for the same target, the definition of the wide-field video frame generated by the wide-field sensor 21 is smaller than that of the narrow-field video frame generated by the narrow-field sensor 23. That is, for the same target, the pixels of the wide-field video frame generated by the wide-field sensor 21 are smaller than the pixels of the narrow-field video frame generated by the narrow-field sensor 23. Here, the definition of the wide-field video frame generated by the wide-field sensor 21 is the definition of the wide-field sensor 21, and the definition of the narrow-field video frame generated by the narrow-field sensor 23 is the definition of the narrow-field sensor 23.

In an embodiment, the wide-field sensor 21 may be a sensor having a resolution of 2 million or 4 million pixels and having better performance at low illumination level, and the narrow-field sensor 23 may be a sensor having a resolution of 4 million or 8 million pixels.

In an example, different narrow-field sensors 23 may be sensors with the same resolution. For example, the camera includes two narrow-field sensors 23, which are sensors with 4 million pixels.

In another example, different narrow-field sensors 23 may be sensors with different resolutions. For example, the camera includes two narrow-field sensors 23. One of the two narrow-field sensors 23 is a sensor having 4 million pixels and the other is a sensor having 8 million pixels.

In an embodiment of the present application, the camera 11 may further include an infrared light compensation assembly. The infrared light compensation assembly performs infrared light compensation for the narrow-field lens assembly 22. Specifically, the processor 24 of the camera 11 controls the infrared light compensation assembly to be turned on or turned off. When the infrared light compensation assembly is turned on, the infrared light compensation is performed for narrow-field lens assembly 22.

In this way, the video frames generated by the narrow-field sensor 23 under front lighting, back lighting and night scenes can have a relatively uniform effect, and the narrow-field sensor 23 can be used for capturing high-definition large images of targets.

In an embodiment of the present application, the camera 11 may further include a white light compensation assembly. The white light compensation assembly performs white light compensation for the wide-field lens assembly 20. Specifically, the processor 24 of the camera 11 controls the white light compensation assembly to be turned on or off. When the white light compensation assembly is turned on, the white light compensation is performed for the wide-field lens assembly 20.

In this way, the video frame generated by the wide-field sensor 21 can have a full-color effect, and the wide-field sensor 21 can also provide key information such as a dress color of the target and the like at night.

In an embodiment of the present application, in order to ensure a complete detection of the target, as shown in FIG. 4, the field of view of the wide-field lens assembly 20 includes part or all of the field of view of the narrow-field lens assembly 22, and the width of an overlapped field of view is greater than a maximum width threshold of the target, the width of the overlapped field of view is the width of an overlapped portion between the field of view of the wide-field lens assembly 20 and the field of view of the narrow-field lens assembly 22. Here, the maximum width threshold of the target may be set empirically. For example, the narrow-field video frame is used for face analysis and the maximum width threshold of human face is 100 pixels, the width of the overlapped field of view is greater than 100 pixels.

In an embodiment of the present application, in order to reduce an image deviation between images caused due to different time for capturing the images, a time deviation between the wide-field sensor 21 and at least one narrow-field sensor 23 is not greater than a duration of one video frame. In an example, in order to reduce a time deviation among video frames generated by different sensors, the wide-field sensor 21 and the at least one narrow-field sensor 23 may use a same clock source. In another example, the wide-field sensor 21 and the at least one narrow-field sensor 23 may use a strictly synchronized clock source.

In the embodiment of the present application, the camera 11 further includes a processor 24. The processor 24 is used for performing human body analysis on the wide-field video frame and performing face analysis or head and shoulder analysis or human body analysis on at least one narrow-field video frame.

In the embodiment of the present application, the processor 24 may use different processing logics for processing video frames generated by different sensors, such as a processing logic for target detection. For example, the processor 24 performs human body analysis on the wide-field video frame generated by the wide-field sensor 21, and performs face analysis or head and shoulder analysis or human body analysis on the narrow-field video frame generated by the narrow-field sensor 23.

In an example, the camera 11 may include a plurality of narrow-field lens assemblies 22 and narrow-field sensors 23 corresponding to the narrow-field lens assemblies 22. The processor 24 can process the narrow-field video frames generated by different narrow-field sensors 23 by the same processing logic. For example, the camera 11 includes two narrow-field sensors 23, and the processor 24 performs face analysis on the narrow-field video frames generated by the two narrow-field sensors 23.

In another example, the camera 11 may include a plurality of narrow-field lens assemblies 22 and narrow-field sensors 23 corresponding to the narrow-field lens assemblies 22, and the processor 24 can process the narrow-field video frames generated by different narrow-field sensors 23 by different processing logics. For example, the camera includes two narrow-field sensors 23, and the processor 24 performs face analysis on a narrow-field video frame generated by one of the narrow-field sensors 23, and performs head and shoulder analysis on a narrow-field video frame generated by the other narrow-field sensor 23.

In the technical solution according to the embodiment of present application, the wide-field lens assembly and the wide-field sensor of the camera can be used for monitoring the entire scene, and the narrow-field lens assemblies and the narrow-field sensors of the camera can be used for capturing high-definition images of targets in the scene to realize the accurate monitoring of targets. In this case, the requirement for monitoring an entire scene and capturing high-definition images of targets can be met by installing one camera in this scene, without adjusting a plurality of cameras to meet the monitoring requirement. which reduces the workload on the installing and adjusting of the cameras for monitoring while realizing scene monitoring.

Figure 5:
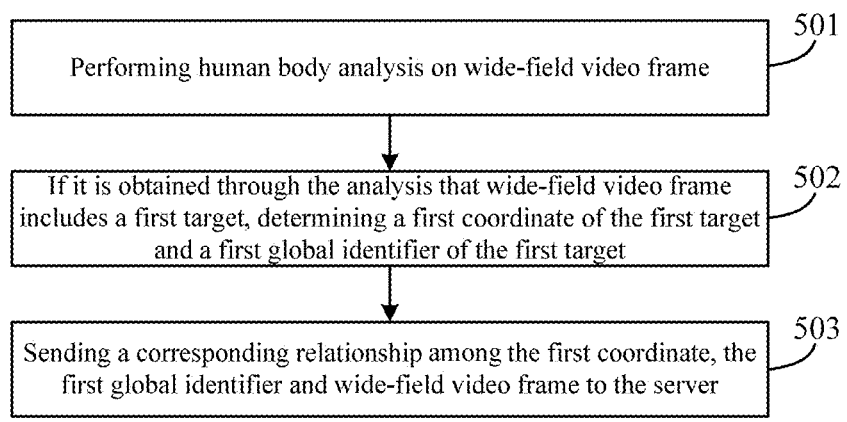
FIG. 5 is a flowchart of processing a wide-field video frame according to an embodiment of the present application.

In an embodiment of the present application, a flow of processing the wide-field video frame by processor 24 may include the following steps, as shown in FIG. 5.

Step 501: performing human body analysis on the wide-field video frame.

In an embodiment, the processor 24 performs human body analysis on each of the wide-field video frames generated by the wide-field sensor 21 to detect whether there is a first target in the wide-field video frame. In this way, the processor 24 may find the first target in time. There may be one or more targets in one wide-field video frame. Here, the first target is taken as an example for explanation. The present application is not limited thereto.

In another embodiment, the processor 24 performs the human body analysis on one wide-field video frame generated by the wide-field sensor 21 at a preset time interval, that is, performs the human body analysis on one wide-field video frame every a preset number of wide-field video frames to detect whether there is a first target in the wide-field video frame. In this way, a load on the processor 24 is reduced, and a processing efficiency of the processor 24 is improved.

Figure 6:
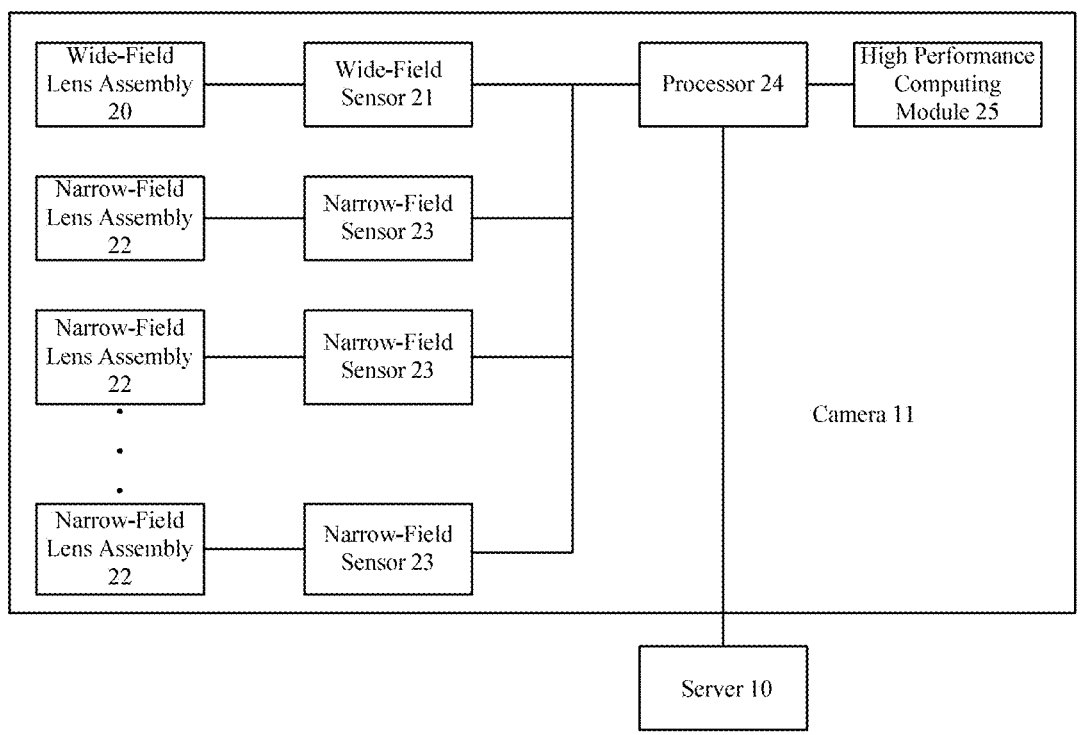
FIG. 6 is a diagram illustrating a second structure of a system for video display according to an embodiment of the present application.

In an embodiment of the present application, in order to facilitate human body analysis of a wide-field video frame and reduce the load on the processor 24, the camera 11 may further include a high-performance computing module 25, as shown in FIG. 6. The processor 24 sends the wide-field video frame to the high-performance computing module 25. The high-performance computing module 25 performs the human body analysis on the wide-field video frame and feeds back an analysis result to the processor 24.

Step 502: if it is obtained through the analysis that the wide-field video frame includes the first target, determining a first coordinate of the first target and a first global identifier of the first target. The first coordinate is a coordinate of the first target in the wide-field video frame. The first coordinate may be a coordinate of a human body center of the first target in the wide-field video frame, a coordinate of a head of the first target in the wide-field video frame, or a coordinate of a shoulder of the first target in the wide-field video frame. The manner of determining the first coordinate is not specifically limited in the embodiment.

After performing the human body analysis on the wide-field video frame, if the processor 24 determines that the wide-field video frame includes the first target, the processor determines the first coordinate of the first target in the wide-field video frame, and the first global identifier of the first target.

In an embodiment, the processor 24 may determine the first global identifier by the following steps.

Step a11: the processor 24 acquires the first coordinate of the first target.

Step a12: the processor 24 detects whether there is a first reference target in targets obtained by analyzing the wide-field video frame last time. If yes, step a13 is performed. If no, step a14 is performed.

The first reference target is a target in the targets obtained by analyzing the wide-field video frame last time, wherein a distance between a coordinate of this target in the wide-field video frame analyzed this time and the first coordinate is predicted by the processor 24 to be less than a preset reference distance threshold. That is, the processor 24 predicts that the distance between the coordinate of the first reference target in the wide-field video frame analyzed this time and the first coordinate is less than the preset reference threshold.

In the embodiment of the present application, the preset reference distance threshold can be set as desired.

Step a13: the processor 24 acquires the global identifier of the first reference target as the first global identifier of the first target.

Step a14: the processor 24 assigns one global identifier to the first target as the first global identifier.

In another embodiment, in order to accurately determine the first global identifier of the first target, the processor 24 may determine the first global identifier by the following steps.

Step a21: the processor 24 acquires the first coordinate and first characteristic information of the first target. Here, the first characteristic information may include, but is not limited to, hair color, hair length, jacket color, trousers color, movement trend, and the like.

Step a22: the processor 24 detects whether there is a first reference target in the targets obtained by analyzing the wide-field video frame last time. If yes, step a23 is performed. If no, step a25 is performed.

The first reference target is a target in the targets obtained by analyzing the wide-field video frame last time, wherein a distance between a coordinate of this target in the wide-field video frame analyzed this time and the first coordinate is predicted by the processor 24 to be less than a preset reference distance threshold. The preset reference distance threshold may be set as desired.

In the embodiment of the present application, there may be one or more first reference targets.

Step a23: the processor 24 detects whether a similarity between characteristic information of the first reference target and the first characteristic information is greater than a preset reference similarity threshold. If yes, step a24 is performed. If no, step a25 is performed.

In the embodiment of the present application, the order of step a22 and step a23 is not limited. As long as the distance between the coordinate of a target obtained by analyzing the wide-field video frame last time in the wide-field video frame analyzed this time and the first coordinate is less than the preset reference distance threshold and the similarity between the characteristic information of the target and the first characteristic information is greater than the preset reference similarity threshold, step a24 is performed; otherwise, step 25 is performed.

Step a24: the processor 24 uses the global identifier of the first reference target as the first global identifier of the first target.

In an embodiment, if the first reference target includes a plurality of first reference targets, the processor 24 calculates the similarity between the characteristic information of each of the first reference targets and the first characteristic information, and detects whether a maximum similarity among the calculated similarities is greater than a preset reference similarity threshold. If yes, the processor 24 uses the global identifier of the first reference target corresponding to the maximum similarity as the first global identifier of the first target.

Step a25: the processor 24 assigns one global identifier to the first target as the first global identifier.

Here, both the first coordinate of the first target and the first characteristic information of the first target are taken into account, which improves the accuracy of determining the first global identifier.

Step 503: sending a corresponding relationship between the first coordinate, the first global identifier and the wide-field video frame to the server 10.

After acquiring the first global identifier, the processor 24 sends the corresponding relationship between the first coordinate, the first global identifier, and the wide-field video frame to the server 10.

In an embodiment, the processor 24 can directly send the corresponding relationship between the first coordinate, the first global identifier, and the wide-field video frame to the server 10.

In another embodiment, the step (step 503) of sending, by the processor 24, the corresponding relationship between the first coordinate, the first global identifier and the wide-field video frame to the server 10 may specifically include the following steps.

Step b11: the processor 24 extracts a first area in which the first target is located from the wide-field video frame.

In the embodiment of the present application, the extracted first area may be a face image including the first target, and may also be a human body image including the first target.

Step b12: the processor 24 encodes the first area to obtain a first target image.

After obtaining the first area, the processor 24 directly encodes the first area to obtain the first target image.

For example, the original resolution of the wide-field video frame is 4 million pixels, and the first area extracted from the wide-field video frame by the processor 24 has 2 million pixels. The processor 24 encodes the first area to obtain the first target image, i.e. the first target image is an image with a resolution of 2 million pixels. In this way, the server can play the first target image at the original resolution, ensuring that the server can obtain a clear first target image.

Step b13: the processor 24 encodes the wide-field video frame to obtain an encoded wide-field video frame with a preset first resolution, wherein the first resolution is equal to or less than the resolution of the wide-field image.

The processor 24 encodes the wide-field video frame at the preset first resolution to obtain the encoded wide-field video frame. That is, the resolution of the wide-field video frame is reduced to the first resolution.

For example, the original resolution of the wide-field video frame is 4 million pixels and the first resolution is 1 million pixels. The processor 24 obtains the stream of the wide-field video frame at 1 million pixels, that is, encodes the wide-field video frame in 1 million pixels to obtain an encoded wide-field video frame of 1 million pixels. The resolution of the wide-field video frame is reduced to 1 million pixels. In this way, the server 10 can play the wide-field video frame at 1 million pixels. As the pixels of the wide-field video frame are reduced, the data amount of the wide-field video frame is reduced, and the transmission efficiency is improved.

In the embodiment of the present application, the order of step b12 and step b13 is not limited.

Step b14: the processor 24 sends the corresponding relationship among the first coordinate, the first global identifier, the encoded wide-field video frame and the first target image to the server 10.

After acquiring the encoded wide-field video frame and the first target image, the processor 24 sends the corresponding relationship among the first coordinate, the first global identifier, the encoded wide-field video frame and the first target image to the server 10.

In an embodiment of the present application, if the processor 24 does not obtain the first target in performing human body analysis on the wide-field video frame, the processor 24 may discard the wide-field video frame and does not send the wide-field video frame to the server 10, so as to save network resources.

Figure 7:
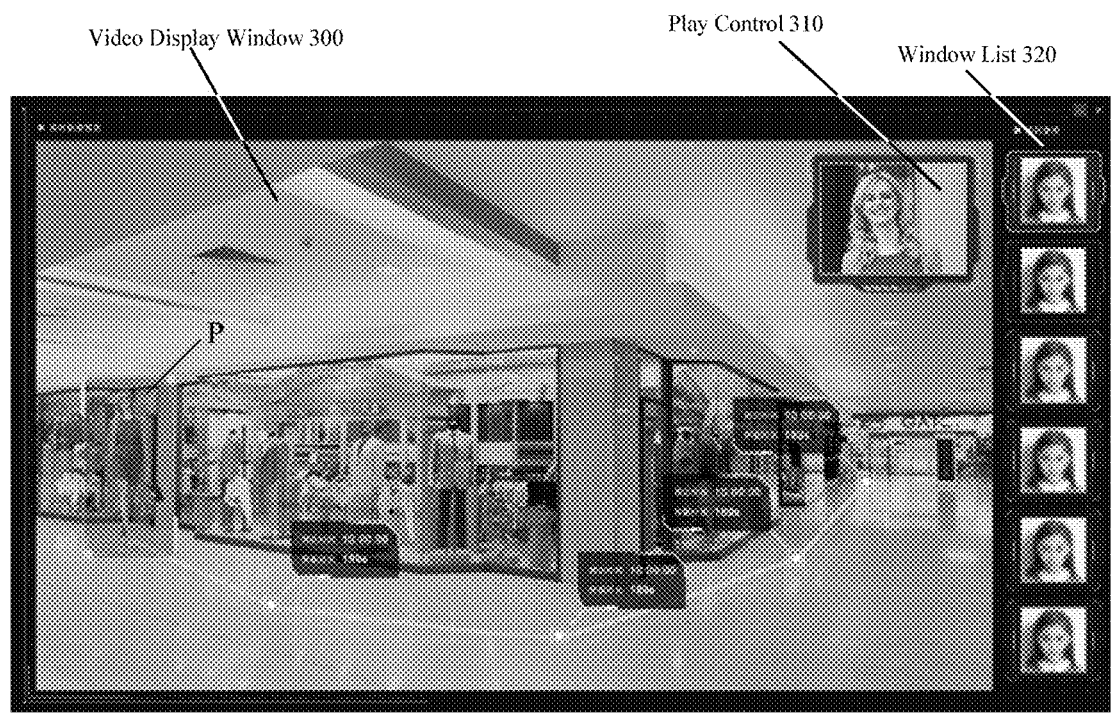
FIG. 7 is a diagram illustrating a video frame of the graphical interface according to an embodiment of the present application.

In the embodiment of the present application, after receiving the wide-field video frame, the server 10 may display the wide-field video frame in the video display window 300. At this time, the server 10 may mark the first target at the first coordinate. For example, the server 10 can mark the first target with a rectangular box. As shown in FIG. 7, the first target is marked with a rectangular box at P position. In this way, the user can conveniently and intuitively view the position of the target. Upon receiving the first target image, the server 10 may display the first target image in the play control 310, or display the first target image in the video display window 300.

Figure 8:
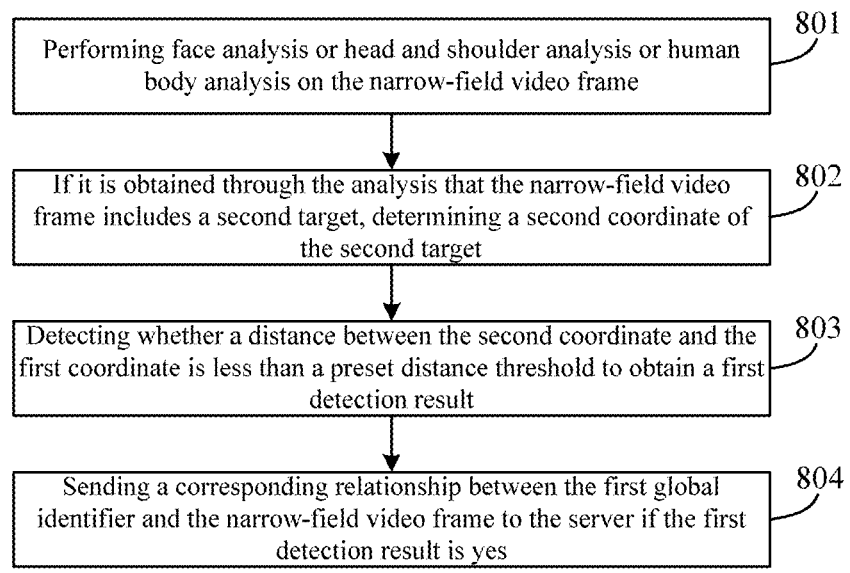
FIG. 8 is a flowchart of processing a narrow-field video frame according to an embodiment of the present disclosure.

In an embodiment of the present application, for a narrow-field video frame generated by each narrow-field sensor 23, a flowchart of processing the narrow-field video frame by the processor 24 may include the following steps, as shown in FIG. 8.

Step 801: performing face analysis, head and shoulder analysis or human body analysis on the narrow-field video frame.

In an embodiment, the processor 24 performs the face analysis, the head and shoulder analysis or the body analysis on each of the narrow-field video frames generated by the narrow-field sensor 23 to detect whether there is a second target in the narrow-field video frame. In this way, the processor 24 can find the second target in time. One narrow-field image may include one or more targets. Here, the second target is taken as an example for explanation, and the embodiment is not limited thereto.

In another embodiment, the processor 24 performs the face analysis, the head and shoulder analysis or the human body analysis on one narrow-field video frame generated by the narrow-field sensor 23 at a preset time interval, that is, performs the face analysis, the head and shoulder analysis or the human body analysis on the narrow-field video frame every a preset number of narrow-field video frames to detect whether there is a second target in the narrow-field video frame. In this way, the load on the processor 24 is reduced, and the processing efficiency of the processor 24 is improved.

Here, the preset time interval for analyzing the narrow-field video frame is the same as the preset time interval for analyzing the wide-field video frame, reducing the image deviation caused due to different time.

In an embodiment of the present application, in order to facilitate the face analysis, the head and shoulder analysis or the human body analysis of narrow-field video frames and reduce the load on the processor 24, the camera 11 may further include a high-performance computing module 25, as shown in FIG. 6. The processor 24 sends a narrow-field video frame to the high-performance computing module 25. The high-performance computing module 25 performs the face analysis, the head and shoulder analysis or the human body analysis on the narrow-field video frame, and feeds back an analysis result to the processor 24.

Step 802: if it is obtained through the analysis that the narrow-field video frame includes the second target, determining a second coordinate of the second target. The second coordinate is a coordinate of the second target in the narrow-field video frame. The second coordinates may be a coordinate of a human body center of the second target in the narrow-field video frame, a coordinate of a head of the second target in the narrow-field video frame, or a coordinate of a shoulder of the second target in the narrow-field video frame. A manner of determining the second coordinate is not specifically limited.

After performing the face analysis, the head and shoulder analysis or the human body analysis on the narrow-field video frame, if the processor 24 determines that the narrow-field video frame includes the second target, the processor 24 determines the second coordinate of the second target in the narrow-field video frame.

Step 803: detecting whether a distance between the second coordinate and the first coordinate is less than a first preset distance threshold to obtain a first detection result.

The first detection result may be YES, that is, the first detection result is that the distance between the second coordinate and the first coordinate is less than the first preset distance threshold. The first detection result may also be NO, that is, the first detection result is that the distance between the second coordinate and the first coordinate is not less than the first preset distance threshold.

In an embodiment of the present application, in order to facilitate determining whether the distance between the second coordinate and the first coordinate is less than the first preset distance threshold, a reference coordinate system may be preset. The processor 24 maps the first coordinate to the reference coordinate system to obtain a first reference coordinate; and maps the second coordinate to the reference coordinate system to obtain a second reference coordinate. The processor 24 calculates a physical distance between the first reference coordinate and the second reference coordinate. If the calculation is performed continuously a preset number of times, and each calculated physical distance is less than the target preset distance threshold, the processor 24 may determine that the first detection result is that the distance between the second coordinate and the first coordinate is less than the first preset distance threshold. Otherwise, the processor 24 may determine that the first detection result is that the distance between the second coordinate and the first coordinate is not less than the first preset distance threshold. The target preset distance threshold may be set according to actual requirements, and the target preset distance threshold may be the same as or different from the first preset distance threshold.

In the embodiment of the present application, the wide-field sensor 21 and the narrow-field sensor 23 may be calibrated to convert the first coordinate and the second coordinate to the reference coordinate system. Here, during the calibration, distortion parameters of the wide-field sensor 21 and the narrow-field sensor 23 are taken into account to correct the distortion of the wide-field sensor 21 and the narrow-field sensor 23.

In an embodiment of the present application, in order to improve a detection efficiency and improve an accuracy of a detection result, in detecting, by the processor 24, whether the distance between the second coordinate and the first coordinate is less than the first preset distance threshold, generation time of the wide-field video frame corresponding to the first coordinate is the same as generation time of the narrow-field video frame corresponding to the second coordinate, or a time deviation between the generation time of the wide-field video frame corresponding to the first coordinate and the generation time of the narrow-field video frame corresponding to the second coordinate is not greater than the duration of one video frame.

Step 804: if the first detection result is YES, sending the corresponding relationship between the first global identifier and the narrow-field video frame to the server 10.

In the embodiment of the present application, if the first detection result is YES, the processor 24 determines that the first target and the second target are the same target, and determines that the global identifier of the second target is the first global identifier of the first target. The narrow-field video frame is associated with the wide-field video frame by the global identifier, which facilitate the server 10 to analyze and process images.

In an embodiment of the present application, in order to accurately determine whether the first target and the second target are the same target, the processor 24 may further obtain first characteristic information of the first target and second characteristic information of the second target. The processor 24 detects whether a similarity between the first characteristic information and the second characteristic information is greater than a preset similarity threshold. If the first detection result is Yes and the similarity between the first characteristic information and the second characteristic information is greater than the preset similarity threshold, the first target and the second target is determined as the same target, the global identifier of the second target is determined as the first global identifier of the first target, and the corresponding relationship between the first global identifier and the narrow-field video frame is sent to the server. The first characteristic information and the second characteristic information include, but are not limited to, information such as movement trend, hair color, and hair length.

In an embodiment of the present application, the step (step 804) of sending, by the processor 24, the corresponding relationship between the first global identifier and the narrow-field video frame to the server may specifically include the following steps.

Step c11: the processor 24 extracts a second area in which the second target is located from the narrow-field video frame.

In the embodiment of the present application, the extracted second area may be a face image including the second target, or may be a human body image including the second target.

Step c12: the processor 24 encodes the second area to obtain a second target image.

After obtaining the second area, the processor 24 directly encodes the second area to obtain the second target image.

For example, the original resolution of the narrow-field video frame is 8 million pixels, the resolution of the code stream obtained by the server is 2 million pixels, and the second area extracted from the narrow-field video frame by the processor 24 is 2 million pixels. The processor 24 encodes the second area to obtain the second target image, i.e. the second target image is an image with a resolution of 2 million pixels. In this way, the server can obtain a code stream at 2 million pixels, and simultaneously obtain a target image with high-definition resolution at the original resolution.

Step c13: the processor 24 encodes the narrow-field video frame to obtain the encoded narrow-field video frame with a preset second resolution, wherein the second resolution is equal to or less than the resolution of the narrow-field video frame.

The processor 24 encodes the narrow-field video frame to obtain the encoded narrow-field video frame with the preset second resolution, which reduces the resolution of the narrow-field video frame to the second resolution.

For example, the original resolution of the narrow-field video frame is 8 million pixels and the second resolution is 1 million pixels. The processor 24 obtains the code stream of the narrow-field video frame at 1 million pixels, that is, encodes the narrow-field video frame at 1 million pixels to obtain the encoded narrow-field video frame, which reduces the resolution of the narrow-field video frame to 1 million pixels. In this way, the server 10 can play the narrow-field video frame at 1 million pixels. As the pixels of the narrow-field video frame are reduced, the data amount of the narrow-field video frame is reduced, and the transmission efficiency is improved.

In the embodiment of the present application, the order of step c12 and step c13 is not limited.

Step c14: the processor 24 sends a corresponding relationship among the second coordinate, the first global identifier, the encoded narrow-field video frame and the second target image to the server 10.

In the embodiment of the present application, the processor 24 processes the narrow-field video frame to obtain the encoded narrow-field video frame and the second target image, and sends the corresponding relationship among the second coordinate, the first global identifier, the encoded narrow-field video frame and the second target image to the server 10. The narrow-field video frame is associated with the wide-field video frame by the global identifier, which facilitate the server 10 to analyze and process the video frames.

In an embodiment of the present application, if the processor 24, by performing the human body analysis on the narrow-field video frame, does not obtain the second target, the processor 24 may discard the narrow-field video frame and does not send the narrow-field video frame to the server, so as to save network resources.

In the embodiment of the present application, after receiving the narrow-field video frame, the server 10 may display the narrow-field video frame in the video display window 300. In this case, the server 10 may mark the second target at the second coordinate. For example, the server 10 may mark the second target with a rectangular box. After receiving the second target image, the server 10 may display the second target image in the play control 310, or may display the second target image in the video display window 300.

The server processes the narrow-field video frame and the second target image in the above-mentioned manner, so that the user may conveniently and intuitively view the location of the target.

In an embodiment of the present application, the processor 24 pre-records a narrow-field high-definition image including the second target. For a narrow-field lens assembly 22, the processor 24 detects a second target in the narrow-field video frame generated by the narrow-field sensor 23, and after extracting a second area in which the second target is located from the narrow-field video frame, calculates a comprehensive score of the second area according to a definition of the second area extracted this time and a posture of the second target in the second area extracted this time. The higher the definition and a similarity between the posture and a preset posture are, the higher the comprehensive score is. The preset posture may be a front face posture of the face.

The processor 24 compares the comprehensive score of the second area extracted this time with the comprehensive score of the recorded narrow-field high-definition image to obtain a second image with a high comprehensive score. The processor 24 updates the recorded narrow-field high-definition image to the second image.

In an embodiment, if the second area extracted this time is an area including the second target in an image in which the second target first appears generated by the narrow-field sensor 23 corresponding to the narrow-field lens assembly, the processor 24 may directly determine the second area extracted this time as the second image, and update the recorded narrow-field high-definition image to the second image extracted this time.

If the processor 24 obtains the second target by analyzing the narrow-field video frame generated by the narrow-field sensor 23, the processor 24 sends a corresponding relationship between the first global identifier and the narrow-field high-definition image to the server when detecting that the second target goes out of the field of view of the narrow-field lens assembly 22 corresponding to the narrow-field video frame (the narrow-field lens assembly 22 corresponding to the narrow-field sensor 23).

In an embodiment of the present application, the processor 24 pre-records a wide-field high-definition image including the first target. For one wide-field lens assembly 20, the processor 24 detects the first target in the wide-field video frame generated by the wide-field sensor corresponding to the wide-field lens assembly, and after extracting a first area in which the first target is located from the wide-field video frame, calculates a comprehensive score of the first area according to a definition of the first area extracted this time and a posture of the first target in the first area extracted this time. The higher the definition and a similarity between the posture and a preset posture are, the higher the comprehensive score is. The preset posture may be a front face posture of the face.

The processor 24 compares the comprehensive score of the first area extracted this time with the comprehensive score of the recorded wide-field high-definition image to obtain a first image with a high comprehensive score. The processor 24 updates the recorded wide-field high-definition image to the first image.

In an embodiment, if the first area extracted this time is an area including the first target in an image in which the first target first appears generated by the wide-field sensor 21, the processor 24 may directly determine the first area extracted this time as the first image, and update the recorded wide-field high-definition image to the first image extracted this time.

If the processor 24 obtains the second target by analyzing a narrow-field video frame generated by a narrow-field sensor 21 and the second target is the same target as the first target, the processor 24 sends a corresponding relationship between the first global identifier and the wide-field high-definition image to the server 10, when detecting that the second target goes out of the field of view of the narrow-field lens assembly 22 corresponding to the narrow-field video frame.

In an embodiment, if the processor 24 obtains the second target by analyzing the narrow-field video frame generated by the narrow-field sensor 23, the processor 24 may further send track information of the first target to the server, when detecting that the second target goes out of the field of view of the narrow-field lens assembly 22 corresponding to the narrow-field video frame. The second target is the same target as the first target. In an example, the track information of the first target includes time that the first target passes through the first coordinate and dwell time of the first target at the first coordinate.

In an embodiment, the processor 24 may determine the track information as follows. Specifically, the processor 24 detects whether a distance between the first coordinate and the newest recorded coordinate of the first target is greater than a second preset distance threshold. If yes, the processor records the first coordinate. If no, the processor does not record the first coordinate. In the case where the second target captured by the narrow-field sensor 23 and the first target are the same target, the processor detects whether the second target goes out of the field of view of the narrow-field lens assembly 22 corresponding to the narrow-field video frame. When the second target goes out of the field of view of the narrow-field lens assembly corresponding to the narrow-field video frame, the processor generates the track information for the first target according to the recorded coordinate of the first target, and sends a corresponding relationship between the first global identifier and the track information for the first target to the server 10.

For example, a coordinate of a target S recorded by the processor 24 is x1-x2-x3, and a newest recorded coordinate of the target S is x3. When obtaining the first coordinate x4 of the target S, the processor 24 detects whether the distance between x4 and x3 is greater than the second preset distance threshold. If yes, the processor 24 records the first coordinate x4, i.e., the recorded coordinate of the target S is updated to x1-x2-x3-x4. If not, the processor 24 does not record the first coordinate x4. In addition, the processor 24 detects whether the target S goes out of the field of view of a narrow-field lens assembly corresponding to a narrow-field video frame. If the target S goes out of the field of view of the narrow-field lens assembly corresponding to the narrow-field video frame, the processor generates the track information for the target S according to the recorded coordinate of the target S, and sends a corresponding relationship between the global identifier of the target S and the track information for the target S to the server 10.

In an embodiment, if the first target matches the second target, that is, the first target and the second target are the same target, the processor 24 may send one piece of alarm information carrying narrow-field information, wide-field information and track information to the server 10, when detecting that the second target goes out of the field of view of the narrow-field lens assembly 22 corresponding to the narrow-field video frame. The narrow-field information includes the corresponding relationship between the first global identifier and the narrow-field high-definition image, the corresponding relationship between the first global identifier and the encoded narrow-field video frame, the second coordinate and the like. The wide-field information includes the corresponding relationship between the first global identifier and the wide-field high-definition image, the corresponding relationship between the first global identifier and the encoded wide-field video frame and the like.

If the first target does not match the second target, that is, the first target and the second target are different, the processor 24 may send one piece of alarm information carrying the narrow-field information to the server 10 when the second target goes out of the field of view of the narrow-field assembly 22 corresponding to the narrow-field video frame.

In the embodiment of the present application, after receiving the alarm information, the server 10 displays the alarm information in the window list 320. In displaying the alarm information in the window list 320, the server 10 may display a narrow-field high-definition image or a wide-field high-definition image included in the alarm information for ease of viewing. As shown in FIG. 7, a plurality of narrow-field high-definition images are displayed in the window list 320 on the right side of the graphical user interface. In displaying the alarm information in the window list 320, the server 10 may also display a serial number of the alarm information and the like. In the embodiment of the present application, the form of the alarm information displayed in the window list 320 is not limited.

When the user selects one piece of alarm information, the server 10 may determine a global identifier corresponding to the alarm information, and find a corresponding narrow-field high-definition image, wide-field high-definition image, track information, and the like by the determined global identifier. The server may display the narrow-field high-definition image or the wide-field high-definition image in the play control. In addition, the server 10 may superimpose and display the obtained track information in the wide-field video frame displayed in the video display window 300.

Figure 9:
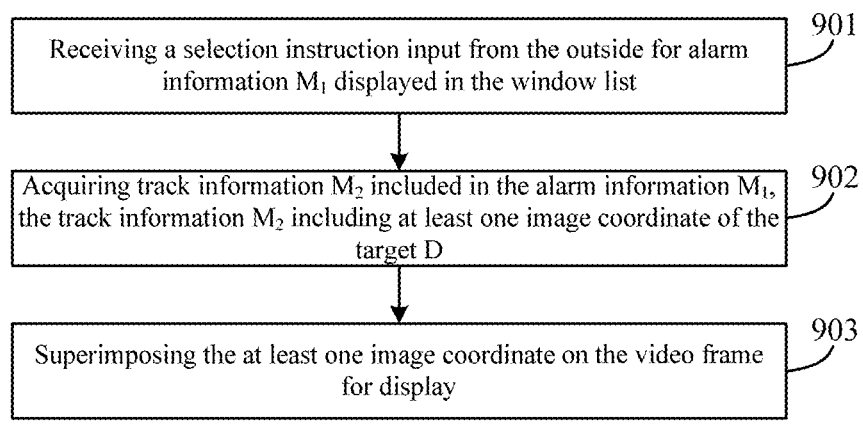
FIG. 9 is a flowchart of a method for video display according to an embodiment of the present application.

Based on the above-mentioned video display system, an embodiment of the present application provides a method for video display. FIG. 9 is a flowchart of a method for video display according to the embodiment of the present application. The method is applied in a server having a graphical user interface. The graphical user interface, as shown in FIG. 3, may include a video display window 300, a window list 320 and a play control 310.

The video display window 300 is located on the left side of the graphical user interface and displays the video frame sent by the camera in real time. The video frame includes N targets, where N is a positive integer, and N≥1.

The window list 320 is located on the right side of the graphical user interface and displays the alarm information associated with each target sent by the camera. The alarm information associated with each target includes track information of the target and an image containing the target. The track information of the target includes at least one image coordinate of the target, and the image containing the target includes a face image and/or a human body image of the target. The above-mentioned image coordinate is a coordinate of the target in the coordinate system of the video frame displayed in the video display window 300.

The play control 310 is located on the upper right side of the video display window 300 and displays the face image or the human body image included in the alarm information.

Based on the graphical user interface, the video display method includes the following steps.

Step 901: receiving a selection instruction, input from the outside, for alarm information $M_1$ displayed in the window list.

In the embodiment of the present application, the user may determine the alarm information $M_1$ associated with the target D among the plurality of pieces of alarm information displayed in the window list according to the information displayed in the graphical user interface, and input the selection instruction for the alarm information $M_1$ to the server by an input device such as a mouse and a keyboard.

In an embodiment, in order to facilitate the user to select the desired alarm information $M_1$ of the target D in the window list, the window list 320 may specifically display a face image or a human body image included in the alarm information. For example, a plurality of face images are displayed in the window list on the right side of the graphical user interface, as shown in FIG. 7, and each face image corresponds to one piece of alarm information.

The process of displaying the face image or the human body image in the window list 320 may include: receiving, by the server, alarm information sent by the camera, wherein the alarm information includes a corresponding relationship between a global identifier, the track information and the image containing the target; saving, by the server, the alarm information, extracting the image containing the target from the alarm information, displaying the image containing the target in the window list 320, and establishing a relationship between the image containing the target and the global identifier in the alarm information.

Step 902: obtaining track information $M_2$ included in the alarm information $M_1$, wherein the track information $M_2$ includes at least one image coordinate of the target D.

After receiving the selection instruction, the server obtains the track information $M_2$ of the target D included in the alarm information $M_1$. The track information $M_2$ includes at least one image coordinate of the target D.

In an embodiment, the alarm information displayed in the window list 320 includes a face image or a human body image, that is, the alarm information displayed in the window list 320 includes the image containing the target. In view of this, the server receives a selection instruction for an image $T_1$ displayed in the window list 320, and after receiving the selection instruction for the image $T_1$ displayed in the window list 320, determines a first global identifier corresponding to the image $T_1$ according to a pre-stored corresponding relationship between the images and the global identifiers. The server determines track information $M_2$ corresponding to the first global identifier according to a pre-stored corresponding relationship between the global identifiers and the track information. Here, the pre-stored corresponding relationship between the global identifiers and the track information may be included in the alarm information pre-stored by the server. For example, the above-mentioned alarm information may include the corresponding relationship between a global identifier, track information and an image of the target.

Step 903: superimposing at least one image coordinate on the video frame for display.

Figure 10A:
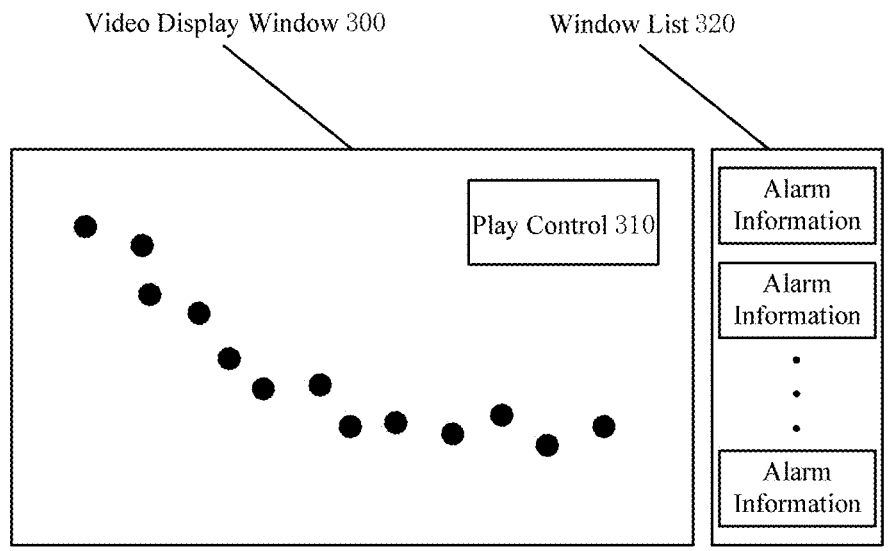
FIG. 10a is a first diagram illustrating track information according to an embodiment of the present application.

In an embodiment, after obtaining the at least one image coordinate of the target D, the server may superimpose the at least one image coordinate on the video frame in the form of a point for display. As shown in FIG. 10*a*, each solid dot in FIG. 10*a* represents an image coordinate, and these image coordinates form the track information of the target D. The track information is superimposed and displayed on the video frame.

Figure 10B:
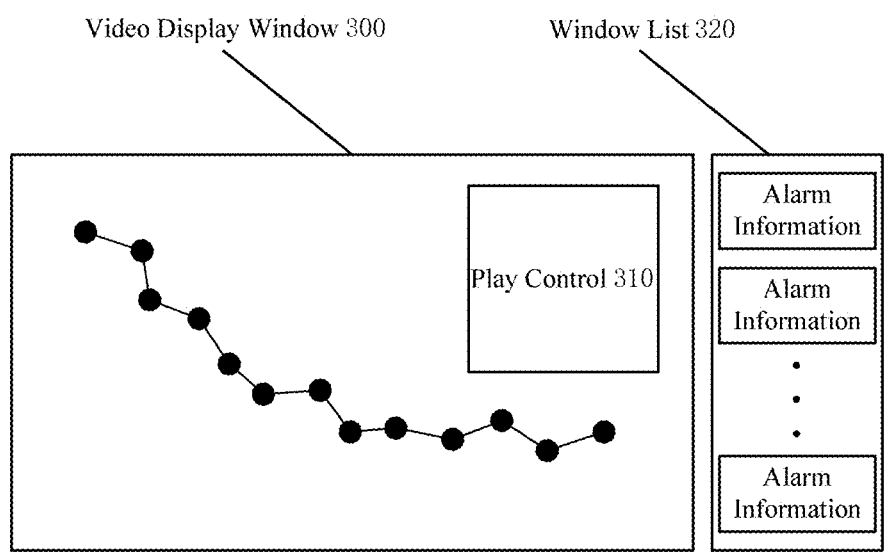
FIG. 10b is a second diagram illustrating track information according to an embodiment of the present application.
Figure 10C:
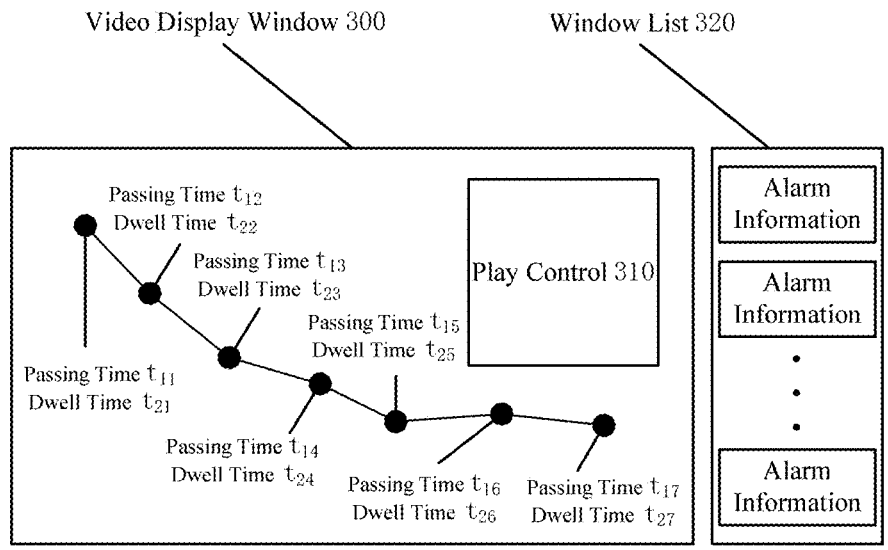
FIG. 10c is a third diagram illustrating track information according to an embodiment of the present application.

In another embodiment, after obtaining the at least one image coordinate of the target D, the server may superimpose the at least one image coordinate on the video frame in a form of a connection line for display, as shown in FIG. 10*b*. Each solid dot in FIG. 10*c* represents an image coordinate, and these image coordinates are connected by straight lines to form the track information of the target D. The track information is superimposed and displayed on the video frame.

In an example, for ease of viewing by a user, the server may select target image coordinates meeting a preset condition in the at least one image coordinate included in the alarm information, superimpose the target image coordinates on the video frame for display, and connect the target image coordinates by straight lines, as shown in FIG. 10*c*. Each solid dot in FIG. 10*c* represents one image coordinate. The target image coordinates are determined in a plurality of image coordinates included in FIG. 10*b*. The plurality of target image coordinates are connected by straight lines to form the track information of the target D. The track information is superimposed and displayed on the video frame.

The above-mentioned preset condition can be set according to user's requirements. For example, the preset condition may be that a distance between the two image coordinates is greater than a distance threshold, or that an interval between time at which the target reaches one of two image coordinates and time at which the target reaches the other of the two image coordinates is greater than a time threshold. The preset condition is not limited in the embodiments of the present application.

In an embodiment, in order to facilitate a user to view and analyze the movement of the target, the above-mentioned track information may further include passing time of the target passing through each image coordinate, and dwell time of the target at each image coordinate. After obtaining the track information $M_2$, the server can also superimpose each passing time and dwell time corresponding to the target D to the corresponding image coordinate on the video frame for display, as shown in FIG. 10*c*.

In an embodiment, after superimposing the at least one image coordinate on the video frame for display, the server may mark the target D at the latest image coordinate of the at least one image coordinate on the video frame. For example, the server may mark the target D with a rectangular box, as shown in FIG. 7.

In an embodiment, in order to facilitate the user to view the target and associate the target with the track information of the target, after receiving the selection instruction, input from the outside, for the alarm information $M_1$ displayed in the window list, the server may obtain the face image or the human body image included in the alarm information $M_1$, and control the play control to display the obtained face image or human body image. For example, as shown in FIG. 7, the obtained face image is displayed in the play control 320.

In the technical solution according to the embodiment of present application, one camera captures a video frame and an image containing a target, wherein the image containing the target includes a face image and/or a human body image of the target. The server displays the video frame in the video display window, displays alarm information in the window list, and displays the face image or the human body image included in the alarm information in the play control. At this time, for a scene, the requirement for monitoring the entire scene and capturing the high-definition images of the target can be met by installing one camera, without adjusting a plurality of cameras to meet the monitoring requirement, which reduces the workload of installing and adjusting the cameras for monitoring while realizing scene monitoring. In addition, the server does not need to stitch video frames and combine track information or the like, which reduces the performance requirement for the server. Therefore, it is not necessary to use the server with higher performance during scene monitoring, reducing monitoring costs.

Figure 11:
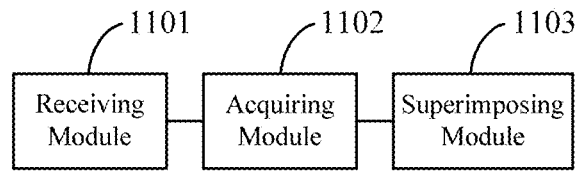
FIG. 11 is a diagram illustrating a structure of an apparatus for video display according to an embodiment of the present application.

Corresponding to the above embodiment of the method for video display, an embodiment of the present application provides an apparatus for video display. FIG. 11 is a structural diagram of a video display apparatus according to an embodiment of the present application. The apparatus is applied in a server with a graphical user interface. The graphical user interface includes:

a video display window located on the left side of the graphical user interface, and configured for displaying a video frame sent by the camera in real time, wherein the video frame includes N targets, where N is a positive integer, and N≥1;

a window list, located on the right side of the graphical user interface and configured for displaying alarm information associated with each target sent by the camera, wherein the alarm information associated with each target includes track information of the target and an image containing the target; the track information of the target includes at least one image coordinate of the target, and the image containing the target includes a face image and/or a human body image of the target; and a play control, located on the upper right side of the video display window, and configured for displaying the face image or the human body image included in the alarm information.

The video display apparatus include a receiving module 1101, an acquiring module 1102 and a superimposing module 1103.

The receiving module 1101 is configured for receiving a selection instruction, input from the outside, for alarm information $M_1$ displayed in the window list.

The acquiring module 1102 is configured for acquiring track information $M_2$ included in the alarm information $M_1$, wherein the track information $M_2$ includes at least one image coordinate of the target D.

The superimposing module 1103 is configured for superimposing the at least one image coordinate to the video frame for display.

In an embodiment, the acquiring module 1102 may be further configured for acquiring a face image or a human body image included in the alarm information $M_1$ after the selection instruction, input from the outside, for the alarm information $M_1$ displayed in the window list is received.

In this case, the video display apparatus may further include a control module configured for controlling the play control to display the acquired face image or human body image.

In an embodiment, the window list may be specifically configured for displaying the face image or the human body image included in the alarm information.

In an embodiment, the receiving module 1101 may be specifically configured for receiving a selection instruction, input from the outside, for an image $T_1$ displayed in the window list.

The acquiring module 1102 may be specifically configured for determining a first global identifier of the image $T_1$, and determining track information $M_2$ corresponding to the first global identifier according to a pre-stored corresponding relationship between the global identifiers and the track information.

In an embodiment, the superimposing module 1103 may be specifically configured for superimposing the at least one image coordinate on the video frame in the form of a point or a connection line for display.

In an embodiment, the track information $M_2$ further includes: passing time of the target D passing through each of the at least one image coordinate, and dwell time of the target D at each of the at least one image coordinate.

In this case, the superimposing module 1103 may be further configured for superimposing each passing time and dwell time corresponding to the target D to a corresponding image coordinate on the video frame for display.

In an embodiment, the superimposing module 1103 may be further configured for marking the target D at the latest image coordinate of the at least one image coordinate on the video frame after superimposing the at least one image coordinate on the video frame for display.

In the technical solution according to the embodiment of present application, one camera captures a video frame and an image containing a target, wherein the image containing the target includes a face image and/or a human body image of the target. The server displays the video frame in the video display window, displays alarm information in the window list, and displays the face image or the human body image included in the alarm information in the play control. At this time, for a scene, the requirement for monitoring the entire scene and capturing the high-definition images of the target can be met by installing one camera, without adjusting a plurality of cameras to meet the monitoring requirement, which reduces the workload of installing and adjusting the cameras for monitoring while realizing scene monitoring. In addition, the server does not need to stitch video frames and combine track information or the like, which reduces the performance requirement for the server. Therefore, it is not necessary to use the server with higher performance during scene monitoring, reducing monitoring costs.

Figure 12:
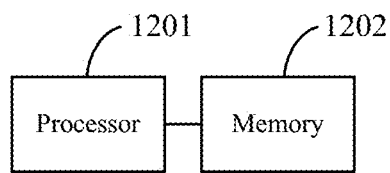
FIG. 12 is a structural diagram of a server according to an embodiment of the present application.

Corresponding to the above embodiment of the method for video display, an embodiment of the present application further provides a server, as shown in FIG. 12, including a processor 1201 and a memory 1202. The memory 1202 is configured for storing a computer program. The processor 1201 is configured for implementing any step of the above method for video display when executing the computer program stored in the memory 1202. In this method, the server has a graphical user interface, and the graphical user interface includes:

a video display window located on the left side of the graphical user interface, and configured for displaying a video frame sent by the camera in real time, wherein the video frame includes N targets, where N is a positive integer, and $N \geq 1$;

a window list, located on the right side of the graphical user interface and configured for displaying alarm information associated with each target sent by the camera, wherein the alarm information associated with each target includes track information of the target and an image containing the target; the track information of the target includes at least one image coordinate of the target, and the image containing the target includes a face image and/or a human body image of the target; and a play control, located on the upper right side of the video display window, and configured for displaying the face image or the human body image included in the alarm information.

The video display method includes:

receiving a selection instruction, input from the outside, for alarm information $M_1$ displayed in the window list;

acquiring track information $M_2$ included in the alarm information $M_1$, wherein the track information $M_2$ includes at least one image coordinate of the target D; and superimposing the at least one image coordinate on the video frame for display.

In the technical solution according to the embodiment of present application, one camera captures a video frame and an image containing a target, wherein the image containing the target includes a face image and/or a human body image of the target. The server displays the video frame in the video display window, displays alarm information in the window list, and displays the face image or the human body image included in the alarm information in the play control. At this time, for a scene, the requirement for monitoring the entire scene and capturing the high-definition images of the target can be met by installing one camera, without adjusting a plurality of cameras to meet the monitoring requirement, which reduces the workload of installing and adjusting the cameras for monitoring while realizing scene monitoring. In addition, the server does not need to stitch video frames and combine track information or the like, which reduces the performance requirement for the server. Therefore, it is not necessary to use the server with higher performance during scene monitoring, reducing monitoring costs.

The memory may include a Random Access Memory (RAM) or a Non-Volatile Memory (NVM), such as at least one disk memory. In an embodiment, the memory may also include at least one storage located away from the processor.

The processor may be a general-purpose processor, including Central Processing Unit (CPU), Network Processor (NP), and the like. The processor may also include Digital Signal Processing (DSP), Application Specific Integrated Circuit (ASIC), Field-Programmable Gate Array (FPGA) or other programmable logic devices, discrete gates or transistor logic devices, discrete hardware components.

An embodiment of the present application further provides a machine-readable storage medium having stored a computer program therein, wherein the computer program is executed by the processor so as to cause the processor perform any step of the above-mentioned method for video display.

It should be noted that, the relationship terms used here, such as first and second, and the like are only used to distinguish one entity or operation from another entity or operation without necessarily requiring or implying any actual relationship or order between these entities or operations. Moreover, the terms "include", "comprise", or any variation thereof, are intended to cover a non-exclusive inclusion, such that processes, methods, articles, or devices including a series of elements include not only those elements that have been listed, but also other elements that have not specifically been listed or the elements intrinsic to these processes, methods, articles, or devices. Without further limitations, elements limited by the wording "comprise(s) a/an . . . " and "include(s) a/an . . . " do not exclude additional identical elements in the processes, methods, articles, or apparatus including the listed element.

All of the embodiments in the description are described in a correlated manner, and identical or similar parts in various embodiments can refer to one another. In addition, the description for each embodiment focuses on the differences from other embodiments. In particular, the embodiments of the apparatus for video display, the server and the machine-readable storage medium are described briefly, since they are substantially similar to the embodiment of the method, and the related contents can refer to the description of the embodiment of the method.

The above descriptions are only the preferred embodiments of the present application, and are not intended to limit the scope of the present application. Any modifications, equivalents, improvements and the like made within the spirit and principle of the present application should be included in the protection scope of the present application.

The invention claimed is:

1. A method for video display, which is applied to a server having a graphical user interface, wherein the graphical user interface comprises:
   a video display window, located on a left side of the graphical user interface and configured for displaying a video frame sent by a camera in real time; wherein the video frame comprises N targets, wherein N is a positive integer, and N≥1;
   a window list, located on a right side of the graphical user interface and configured for displaying alarm information associated with each target sent by the camera; wherein the alarm information associated with each target comprises track information of the target and an image containing the target, wherein the track information of the target comprises at least one image coordinate of the target, and the image containing the target comprises a face image and/or a human body image of the target, and the alarm information comprises a pre-stored corresponding relationship between a global identifier, the track information, and the image containing the target;
   a play control, located on an upper right side of the video display window, and configured for displaying the face image or the human body image comprised in the alarm information;
   the method comprising:
   receiving a selection instruction, input from the outside, for the alarm information displayed in the window list, to select alarm information associated with a target D from the alarm information displayed in the window list, wherein the target D is a target among the N targets;
   acquiring the track information comprised in the alarm information, wherein the track information comprises at least one image coordinate of the target D, wherein acquiring the track information comprised in the alarm information comprises: determining a first global identifier corresponding to an image containing the target D in the alarm information based on the pre-stored corresponding relationship; and determining the track information corresponding to the first global identifier based on the pre-stored corresponding relationship;
   superimposing the at least one image coordinate on the video frame for displaying in the video display window, wherein superimposing the at least one image coordinate on the video frame for displaying comprises: selecting target image coordinates meeting a preset condition in the at least one image coordinate comprised in the alarm information, and superimposing the target image coordinates on the video frame in a form of points or a connection line for displaying, wherein the preset condition is that a distance between two image coordinates is greater than a distance threshold, or that an interval between a time at which the target D reaches one of two image coordinates and a time at which the target D reaches the other of the two image coordinates is greater than a time threshold; and
   acquiring the face image or the human body image of the target D comprised in the alarm information, and controlling the play control to display the acquired face image or human body image of the target D.

2. The method of claim 1, wherein the window list is further configured for displaying the face image or the human body image comprised in the alarm information.

3. The method of claim 1, wherein the track information further comprises: passing time of the target passing through each of the at least one image coordinate and dwell time of the target at each of the at least one image coordinate; and the method further comprises:
   superimposing each passing time and dwell time corresponding to the target to a corresponding image coordinate on the video frame for display.

4. The method of claim 1, wherein after superimposing the at least one image coordinate on the video frame for display, the method further comprises:
   marking the target at a latest image coordinate of the at least one image coordinate on the video frame.

* * * * *